Dec. 10, 1929.　　　C. E. JOHNSON　　　1,738,534
OIL CONSERVING PISTON
Filed Feb. 19, 1929
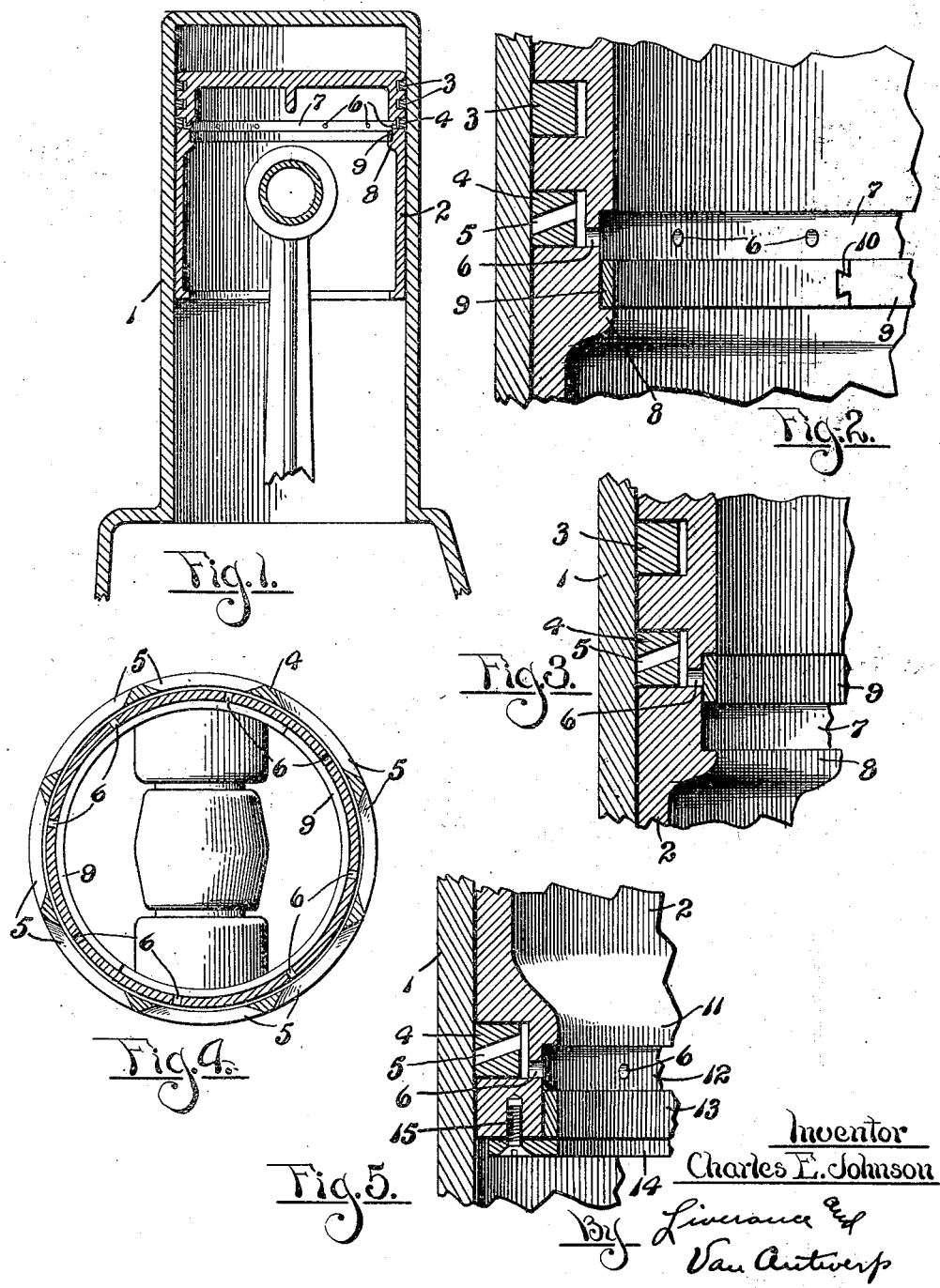
Inventor
Charles E. Johnson
By Liverance and Van Antwerp
Attorneys Patented Dec. 10, 1929

1,738,534

UNITED STATES PATENT OFFICE

CHARLES E. JOHNSON, OF MUSKEGON, MICHIGAN

OIL-CONSERVING PISTON

Application filed February 19, 1929. Serial No. 341,103.

This invention relates to an oil saving or conserving piston, adapted for use in engines, particularly internal combustion engines which are used in automobiles. The problem of lubricating the pistons without passage of lubricating oil into a combustion chamber or chambers of an engine, particularly where the engines are run at very high speeds in motor vehicles, is one of considerable importance. It has heretofore been considered good practice to provide drainage openings through the sides of the piston, usually from the bottom of a piston ring groove, and to use in said piston ring groove a piston ring of a type which will act to remove excess of oil from the walls of the cylinder, carry it into said groove, from which it passes through the drainage openings to the interior of the piston back to the crank case. This proves very satisfactory in engines not running at too high speeds, but in the high speeds of the engine, on the downward movement of the piston, the air trapped underneath is compressed to a greater or less degree, depending upon the speed of movement of the piston, and the air tends to force the oil in said drainage openings and in the piston ring groove where it has collected outwardly and back against the walls of the cylinder. On the up stroke of the piston the direct opposite occurs, that is, there is a partial vacuum formed underneath the piston which tends to draw the oil inwardly but as the same has been forced out of the groove on the previous down stroke there is little oil to be drawn to the interior of the piston and the resultant saving of oil is negligible at the high speeds of the engine.

It is a primary object and purpose of the present invention to provide a very simple yet effective construction of piston, supplying it with means which will automatically close the drainage openings to the interior of the pistons on the down stroke thereof and open them on the up stroke so that oil scraped from the walls of the cylinder and carried into the ring groove on a down stroke is not hampered as to its collection by air pressure working thereagainst, while on the succeeding up stroke of the piston the vacuum occurring will cause the oil, which has been collected in the ring groove, to be drawn through the drainage openings to the interior of the piston with a resultant saving and conserving of lubricating oil; and this will occur irrespective of the speed of the engine, in fact, will be more effective at high speeds than at low speeds.

An understanding of the invention for the attainment of the ends stated may be had from the following description taken in connection with the accompanying drawing, in which, Fig. 1 is a vertical section through a cylinder and piston, the piston being made in accordance with my invention.

Fig. 2 is a fragmentary enlarged vertical section through the piston and adjacent portion of the cylinder, showing the drainage opening closure means in the position which it occupies on the up stroke of the piston leaving said drainage openings open.

Fig. 3 is a similar view illustrating the same on the down stroke of the piston.

Fig. 4 is a substantially horizontal section taken through a piston in the horizontal plane of the drainage openings therethrough, and, Fig. 5 is a view similar to Fig. 2, illustrating a slightly different form or modification of the invention.

Like reference characters refer to like parts in the different figures of the drawing.

The cylinder 1 may be of any usual and conventional construction, having a piston 2 mounted therein for reciprocation, and provided adjacent its upper end with a thickened portion in which ring grooves are cut for the reception of piston rings 3 and 4. The ring 4, which is the lowest ring of the series, is of a scraping and drainage type having a plurality of slots cut therethrough indicated at 5, in accordance with my Patent No. 1,558,091, issued October 20, 1925. This or any other preferred oil collecting ring may be used, whereby oil will be scraped from the walls of the cylinder and carried into the ring groove back of the piston ring.

Through the sides of the piston from the ring groove which carries the ring 4, a plurality of spaced apart drainage openings 6 are provided, the inner ends of which come to an interior relatively shallow groove 7, cut at the inner side of the piston at the lower portion of the thickened upper part of the piston, provided for ring grooves. The lower side of the interior groove 7 is a continuous annular horizontal ledge 8. As many of the openings 6 may be made as may be found desirable in practice.

The shallow interior groove 7 is of considerable height and in it an inner ring is positioned, preferably formed of two semi-circular sections 9 connected at their ends by dove-tailed connections illustrated at 10, this being necessary for assembly in passing the ring sections above the wrist pin bosses of the piston and above the ledge 8. When the two sections 9 are thus joined together they form a ring which is loosely received within the groove 7. The width of the inner ring is such that when it is in its lower position bearing upon the ledge 8, the inner ends of all of the drainage openings 6 are uncovered.

It is evident that on the up stroke of the piston the inner ring will occupy the lower position shown in Fig. 2, the openings 6 will be uncovered and there is a free passage for the oil, which, by reason of the vacuum under the piston passes freely to the interior of the piston. On the down stroke of the piston, however, because of the inertia of the interior ring, it will occupy the upper position in the interior groove 7, as shown in Fig. 2, closing the inner ends of the passages 6 and obstructing the air which under compression would tend to rush into said passages and drive oil back toward the walls of the cylinder.

In Fig. 5 a slight modification of the structure is made. The lower end of the piston is thickened, as indicated at 11, in order that a ring groove for receiving the drainage ring 4 may be cut and said ring 4 is placed around the lower end of the piston, while at the inner side the metal is cut away to make an annular ring receiving recess 12, in which the interior ring 13 is located. Because of the position of the interior ring in this case it is not necessary to divide it and make it in sections, as described with reference to the construction shown in previous figures. In order to keep the ring 13 from disengaging from the piston a horizontal retaining ring 14 having an inwardly projecting ledge, against which the ring 13 bears in lower position, is located below the lower end of the piston and secured thereby by screws 15. The operation and function of the ring 13 are the same as previously described with respect to the ring made up of the sections 9 in Figs. 1, 2 and 3.

The construction described, while simple in character, is very efficient for the purpose of saving or conserving lubricating oil in engines, particularly at the higher speeds of an engine. The construction may be readily applied to pistons at very little additional cost. The invention is defined in the appended claims and is to be considered comprehensive of all forms of structure coming within their scope.

I claim:

1. A piston provided with a groove around the same and a plurality of oil drainage passages leading from the bottom of the groove to the interior of the piston, and a ring loosely mounted at the interior of the piston and movable between upper and lower positions, in the upper position of which it covers the inner ends of said passages.

2. A piston adapted for vertical reciprocation having an oil collecting groove around the same and passages extending from the bottom of said groove to the interior of the piston, said piston having an interior groove on its inner side to which said passages lead, and a ring loosely mounted in said interior groove of the piston having a width less than the width of said interior groove, whereby the ring may be moved vertically back and forth in said groove, said ring in its uppermost position covering the inner ends of said passages.

3. A piston adapted for vertical reciprocation in a cylinder having a piston ring groove around the same and passages leading from said groove to the interior of the piston, a piston ring in the piston ring groove adapted to scrape excess oil from the walls of the cylinder in which the piston operates, said piston ring having passages to carry the oil to the bottom of said groove, and means around the interior of said ring loosely mounted for up and down movement, and stop means for stopping the upward movement of said means in a position where it will cover the inner ends of said drainage passages.

4. A construction containing the elements in combination defined in claim 3, combined with stop means to limit the movement of said interior means in a downward direction and stop the same in a lower position in which said inner ends of the passages will be uncovered and unobstructed.

5. A piston adapted for vertical reciprocation in a cylinder having oil collecting means at its outer sides and passages to drain said oil through the walls of the piston to the interior thereof, and a vertically reciprocable ring loosely mounted at the interior of the piston, combined with upper and lower stops to limit the movement of said ring and stop the ring at its upper extreme of movement in a position to cover said oil drainage passages, and at its lower extreme of movement in a position to uncover the same.

6. In combination with a vertical cylinder, a piston mounted for vertical reciprocation therein, said piston having means to collect excess of oil on the walls of the cylinder, and drainage passages through the piston to carry said oil to the interior of the piston, and a loosely mounted ring at the interior of the piston adapted for vertical reciprocatory movements between extreme upper and lower positions, in said upper position covering the inner ends of said drainage passages and in its lower position uncovering the same.

In testimony whereof I affix my signature.

CHARLES E. JOHNSON.